United States Patent
Matsunaga et al.

(10) Patent No.: US 6,622,894 B2
(45) Date of Patent: Sep. 23, 2003

(54) ARTICLE FEEDING AND DISCHARGING DEVICE

(75) Inventors: Iruru Matsunaga, Sagamihara (JP); Kouichi Watanabe, Atsugi (JP); Kinya Ishida, Atsugi (JP)

(73) Assignee: Anritsu Corporation, Tokyo (JP)

( * ) Notice: Subject to any disclaimer, the term of this patent is extended or adjusted under 35 U.S.C. 154(b) by 128 days.

(21) Appl. No.: 09/958,796

(22) PCT Filed: Feb. 27, 2001

(86) PCT No.: PCT/JP01/01469

§ 371 (c)(1),
(2), (4) Date: Oct. 15, 2001

(87) PCT Pub. No.: WO01/62637

PCT Pub. Date: Aug. 30, 2001

(65) Prior Publication Data

US 2002/0158080 A1 Oct. 31, 2002

(30) Foreign Application Priority Data

Feb. 28, 2000 (JP) ......................................... 2000-051525

(51) Int. Cl.⁷ .................................................. B67D 3/00
(52) U.S. Cl. .......................................... 222/504; 222/63
(58) Field of Search ................................. 222/517, 533, 222/570, 573, 63, 57, 58, 504

(56) References Cited

U.S. PATENT DOCUMENTS

| 4,155,297 A | * | 5/1979 | Smith et al. ................... 100/52 |
| 4,452,149 A | * | 6/1984 | LeMarbe ..................... 105/250 |
| 5,144,895 A | * | 9/1992 | Murray ........................ 105/286 |
| RE36,685 E | * | 5/2000 | Bounds ..................... 105/311.1 |

FOREIGN PATENT DOCUMENTS

| JP | 36-3096 | 4/1932 |
| JP | 59-180612 A | 10/1984 |
| WO | WO 98/01727 A1 | 1/1998 |

* cited by examiner

Primary Examiner—Gene Mancene
Assistant Examiner—Melvin A. Cartagena
(74) Attorney, Agent, or Firm—Frishauf, Holtz, Goodman & Chick, P.C.

(57) ABSTRACT

A motor (17a, 17b) opens and closes a shutter turnably mounted so as to open and close a discharge port relevant to a hopper, and generates a torque against a load in a gravity direction of materials dropped from a material supply mechanism to the hopper. A shutter control portion (19a, 19b, . . . 19h) sets a hold current applied to the motor from the start of loading relevant to the shutter caused by the materials to be dropped to a predetermined period, to a first hold current value for applying to the shutter a torque sufficient to bear the shock during charge of the materials. In addition, the control portion sets a hold current applied to the motor from an elapse of the predetermined period after reception of the materials by the hopper to the start of discharging the materials from a discharge port of the hopper, to a second hold current value that is smaller than the first hold current value, the second hold current value applying to the shutter a torque against a force released downwardly under a load in the gravity direction of the materials.

16 Claims, 8 Drawing Sheets

ARTICLE FEEDING AND DISCHARGING DEVICE

This application is a U.S. National Phase Application under 35 USC 371 of International Application PCT/JP01/01469 (not published in English) filed Feb. 27, 2001.

TECHNICAL FIELD

The present invention pertains to a material supply and discharge apparatus. More particularly, the present invention relates to a material supply and discharge apparatus having incorporated therein a hopper for temporarily holding a upwardly supplied material, and then, discharging the material from a downward discharge port.

BACKGROUND ART

A packaging system for automatically packing a variety of materials in bags in a predetermined weight incorporates a combination weighing device for weighing separate materials sequentially supplied from the outside in combination.

Figure 9A:
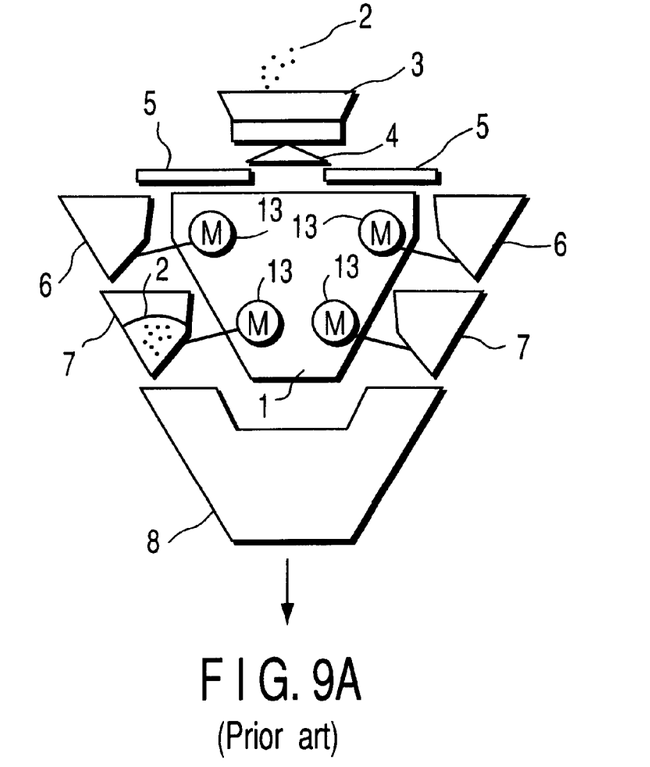
FIGS. 9A and 9B are a side view and a partial view each schematically showing a configuration of a general, conventional combination weighing device.

FIG. 9A is a schematic cross section showing a configuration of this combination weighing device.

That is, a funnel 3 for collecting separate materials 2 such as confectionery or caramel, for example, supplied from the outside is arranged upwardly of a reverse cone shaped frame 1.

Materials 2 collected by this funnel 3 are dispersed in a radiation manner by means of a dispersion feeder 4 provided at the lower part of the funnel 3. The thus dispersed materials are then supplied to stock hoppers 6 (only two hoppers shown) arranged along the peripheral face of the reverse cone shaped frame 1 by means of a plurality of forwarding feeders 5 arranged in a radiation manner on the frame 1.

Figure 9B:
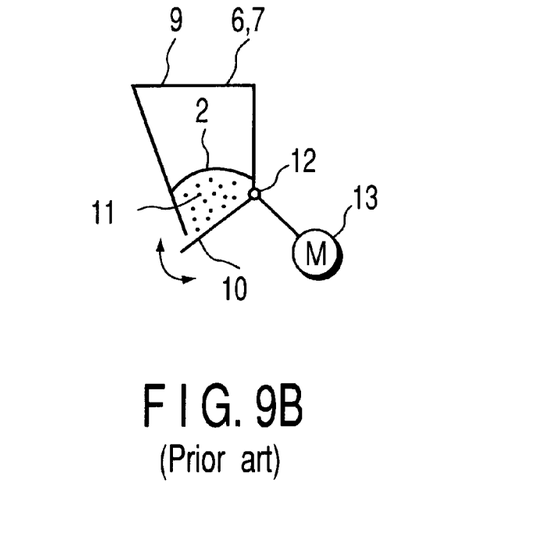

The materials 2 supplied to stock hoppers 6 are temporarily held on these stock hoppers 6. Then, as shown in FIG. 9B described later, a shutter 10 provided at the bottom of each of these stock hoppers 6 is released, whereby the supplied materials are moved to a plurality of weighing hoppers 7 (only two hoppers shown) provided downwardly of each of the stock hoppers 6.

The weight of each of the materials 2 moved to these weighing hoppers 7 is weighed for each of weighing hoppers 7.

That is, the weight of each of the materials 2 carried inside of a respective one of a plurality of weighing hoppers 7 is weighed by a respective one of the plurality of weighing hoppers 7 arranged along the peripheral face of the reverse cone shaped frame 1.

Thereafter, there are selected each of the weighing hoppers 7 housing the materials 2 each of which a total of weight values obtained by combining the weight values of the materials 2 for the weighing hoppers 7 each coincides with a predetermined weight value or is within the range of a predetermined tolerance.

As shown in FIG. 9B described later, the shutters 10 each provided at the bottom of each of the selected weighing hoppers 7 are released, whereby the materials 2 each are guided to a collection shoot 8 provided downwardly of each of the weighing hoppers 7.

Therefore, a bag (not shown) is placed downwardly of this collection shoot 8, whereby the materials 2 are housed in that bag by the predetermined weight value, and are automatically packed.

FIG. 9B is a schematic cross section of each of the stock hoppers 6 and each of the weighing hoppers 7.

The stock hoppers 6 each and the weighing hoppers 7 each have a receptacle port 9 for the materials 2 at the upper end, and have a discharge port 11 for the materials formed at the lower end.

The previously described shutter 10 for opening and closing the discharge port 11 is mounted on a shaft 12 provided at one end of this discharge port 11.

A shaft of a stepping motor 13, for example, is linked with this shaft 12.

This stepping motor 13 is driven, whereby the shutter 10 is turned, and the discharge port 11 is controlled to be opened and closed.

Here, the stepping motor 13 rotates the shaft 12 by an angle according to the number of pulses for a pulse driving current applied to an energizing coil.

Therefore, the number of pulses for the driving current applied to this stepping motor 13 is controlled, whereby a rotation angle of the shaft of the stepping motor 13, i.e., an opening of the shutter 10 can be arbitrarily set.

In order to improve the operation response performance of the shutter 10, it is desirable to use the stepping motor 13 rather than a general direct current motor or inductive motor.

However, in a combination weighing device configured as shown in FIGS. 9A and 9B as well, the following problems remain unsolved.

That is, this combination weighing device is not executed by sliding a shutter opening and closing operation in order to ensure high response characteristics in shutter opening and closing operation. As shown in FIG. 9B, the weighing device is executed by fixing one end of the shutter 10 to the shaft 12, and then, rotating this shaft 12 by means of the stepping motor 13.

In a state in which materials 2 are housed in each of the stock hoppers 6 or each of the weighing hoppers 7, the load in the gravity direction of the materials 2 is applied to the shutter 10.

In the case where the shutter 10 is of slide type, the load in this gravity direction is subjected to a shutter holding mechanism, for example, a slide groove.

Hence, as shown in FIG. 9B, in a system for the shutter 10 to turn around the shaft 12, while the shutter 10 is closed, a hold current is fed to the stepping motor 13 linked with the shaft 12, thereby making it necessary to prevent the shutter 10 from turning when the load in the gravity direction of the materials 2 is applied.

In the meantime, while the shutter 10 is closed, it is general that the materials 2 are charged (dropped) intensively within a short period of time instead of being charged (dropped) continuously.

Therefore, the load in the gravity direction is not uniformly applied to the shutter 10 while the shutter 10 is closed. The load value is greater than the weight of the materials 2 by a shock applied while the materials are charged for a short period of time.

In order to prevent the shutter 10 from being opened due to this shock applied when the materials 2 are charged, it is required to set a hold current relevant to the stepping motor 13 to a hold current value such that the stepping motor 13 can apply to the shutter 10 a torque sufficient to bear the shock when the materials 2 are charged.

In this case, as described above, the materials 2 relevant to all the periods in which the shutters 10 in each of the stock hoppers 6 and each of the weighing hoppers 7 are closed are charged intensively within a short period of time.

Therefore, feeding a hold current bearing the shock when the materials 2 are charged to the stepping motor 13 all over the period when the shutters 10 are closed, including a period after the materials have been charged, causes wasteful power consumption.

In particular, in a combination weighing device as shown in FIG. 9A, there are provided a number of stock hoppers 6 and a number of weighing hoppers 7 arranged along the peripheral face of the reverse cone shaped frame 1. Thus, there occurs a problem that power consumption of the entire device increases, and the running cost of the combination weighing device increases.

When the shutter 10 is closed, the shutter 10 is suspended by a spring or the like against the load in the gravity direction of the materials 2, whereby the hold current relevant to the stepping motor 13 can be eliminated.

However, this spring is always connected. Therefore, in the case of opening the shutter 10, it is required to feed to the stepping motor an energizing current sufficient to overcome the biasing force of this spring, which causes wasteful power consumption.

DISCLOSURE OF INVENTION

The present invention has been made in order to solve the foregoing problem. It is an object of the present invention to provide a material supply and discharge apparatus for changing a hold current relevant to a motor in a state in which a hopper shutter is closed according to a material charge period and the subsequent period, thereby making it possible to restrain power consumption and reduce running cost while maintaining excellent shutter characteristics.

According to a first aspect of the present invention, in order to achieve the foregoing object, there is provided a material supply and discharge apparatus comprising:

- a hopper (6a, 7a) having a receptacle port for materials at an upper end thereof and a discharge port for the materials at a lower end thereof;
- a material supply mechanism (4, 5, 6a) disposed upwardly of the hopper, the mechanism causing the materials to be dropped from the reception port into the hopper;
- shutter (10) turnably mounted so as to open and close the discharge port relevant to the hopper, the shutter being driven to be opened and closed so as to be released downwardly under a load in the gravity direction of the materials when the materials are dropped from the material supply mechanism after the discharge port has been closed in order to temporarily hold the materials in the hopper;
- a motor (17a, 17b) linked with the shutter in order to drive the shutter to be opened and closed, a holding current being applied during closing of the shutter, thereby the shutter imparting to the shutter a torque against a force released downwardly by the load in the gravity direction of the materials; and
- a shutter control portion (19a) for setting the hold current applied to the motor from the start time for loading applied to the shutter caused by the materials dropped from the material supply mechanism to a predetermined period, to a first hold current value capable of applying to the shutter a torque bearing a shock when the materials are charged, and setting a hold current applied to the motor from after an elapse of the predetermined period to the start of discharge from a discharge port of the hopper to a second hold current value smaller than the first hold current value capable of applying to the shutter a toque against a force released downwardly under a load in the gravity direction of the materials.

In the material supply and discharge apparatus configured according to the first aspect, while the shutter of the hopper is closed, at the start of loading applied to the shutter when materials are started to be charged (dropped) into the hopper from the material supply mechanism, a high hold current sufficient to bear the shock is fed to the motor. However, after the start time for material charge (drop) into the hopper has elapsed, the hold current relevant to the motor may be smaller than a hold current when charging (dropping) is started. Therefore, power consumption caused by a hold current in a period when the hopper shutter is closed can be restrained.

According to a second aspect of the present invention, in order to achieve the foregoing object, there is provided a material supply and discharge apparatus according to the first aspect, wherein the shutter control portion (19a) comprises a motor control portion (20) for controlling the holding current so that an average current value of the hold current applied to the motor is reduced until the materials has been started to be discharged from the hopper discharge port after the materials have been received by the hopper as compared with the hold current value relevant to the motor at the start of loading relevant to the shutter caused by the materials dropped from the material supply mechanism.

In the material supply and discharge apparatus configured according to the second aspect, as in the first aspect, while the shutter of the hopper is closed, at the start of loading relevant to the shutter caused by the materials being started to be charged (dropped) into the hopper from the material supply mechanism, a high hold current sufficient to bear the shock is fed to the motor. However, after the start time for material charge (drop) into the hopper has elapsed, a motor hold current may be smaller than a hold current when charging (dropping) starts. Therefore, power consumption caused by a hold current in a period when the hopper shutter is closed can be restrained.

According to a third aspect of the present invention, in order to achieve the foregoing object, there is provided a material supply and discharge apparatus according to the first aspect, further comprising hold current adjusting means (29, 30) for adjusting a relationship between the first hold current value and second hold current value relevant to the motor at the start of the loading according to physical attributes of materials supplied into the hopper from the material supply mechanism.

According to a fourth aspect of the present invention, there is provided a material supply and discharge apparatus according to the second aspect, further comprising hold current adjusting means (29, 30) for adjusting a relationship between the first hold current value relevant to the motor at the start of the loading and the average current value according to physical attributes of materials supplied into the hopper from the material supply mechanism.

In the material supply and discharge apparatus configure according to the third and fourth aspects, a relationship between a hold current value when loading starts and an average current value is adjusted according to physical attributes such as weight per material to be charged (dropped) into a hopper, a total weight, or shape.

That is, according to the material supply and discharge apparatus configured according to the third and fourth aspects, the shock greatly varies depending on the physical attributes of the materials. Thus, the hold current value when the most efficient loading starts can be selected.

According to a fifth aspect of the present invention, there is provided a material supply and discharge apparatus according to the third aspect, wherein the hold current adjusting means (29, 30) comprises a hold current condition setting table (29) and a current adjuster circuit (30), wherein the first hold current value and a period of applying the first hold current and the second hold current value and a period of applying the second hold current or the like are stored for each of types of the materials in the hold current condition setting table, and the types of materials primarily include physical attributes of materials such as the weight, shape, and specific gravity of each material or a total weight of materials to be housed one time in one hopper, the physical attributes being a milestone of a shock during material drop or a static weight after dropped; wherein the shutter control portion sets a period of applying the first hold current and a period of applying the second hold current as periods specified according to type of the material from the hold current condition setting table; and wherein the current adjuster circuit sets the first hold current value and second hold current value as current values specified according to type of the material from the hold current condition setting table.

In addition, according to a sixth aspect of the present invention, in order to achieve the foregoing object, there is provided a material supply and discharge apparatus according to the fourth aspect, wherein the hold current adjusting means (29, 30) comprises a hold current condition setting table (29) and a current adjuster circuit (30), wherein a hold current value relevant to the motor when the loading starts and a period of applying the hold current and the average current value and a period of applying the average value are stored for each type of the material in the hold current condition setting table, and types of the materials primarily include physical attributes of materials such as the weight, shape, and specific gravity of each material or a total weight of materials to be housed one time in one hopper, the physical attributes being a milestone of a shock during a material drop or a static weight after dropped; wherein the shutter control portion sets a period of applying a hold current to the motor when the loading starts from the hold current condition setting table and a period of applying the average current as periods specified according to type of the material; and wherein the current adjuster circuit sets the hold current value relevant to the motor when the loading starts from the hold current condition setting table and the average current value as current values specified according to type of the material.

In addition, according to a seventh aspect of the present invention, in order to achieve the foregoing object, there is provided a material supply and discharge apparatus according to the first or second aspect, wherein the shutter control portion (19a) controls a current value of an energizing current supplied to the motor according to a change of a torque required for opening and closing of the shutter during a period for opening and closing operation of the shutter.

In general, a torque required for opening and closing a shutter turnably mounted on a hopper discharge port is not constant during an opening and closing period, and greatly changes.

That is, a large torque is required at the initial state of a shutter opening operation or at the initial stage of a closing operation. When a predetermined period of time has elapsed, the required torque is reduced.

Because of this, at the initial stage of a shutter opening operation requiring a large torque or during a closing operation, it is required to increase an energizing current supplied to a motor. Conversely, when a small torque is applied after the predetermined period of time has elapsed, the energizing current supplied to the motor may be reduced.

Therefore, in the material supply and discharge apparatus configured according to the seventh aspect, a current value of an energizing current supplied to the motor is changed according to a change of a torque required for opening and closing of the shutter, whereby wasteful power consumption can be restrained, and power consumption can be restrained while maintaining excellent shutter characteristics.

In addition, according to an eighth aspect of the present invention, there is provided a material supply and discharge apparatus according to the first or second aspect, wherein the shutter control portion (19a) controls the hold current value so as to be changed according to a change of a torque when the material is charged.

In the material supply and discharge apparatus configured according to the eighth aspect, a hold current value supplied to the motor is changed according to a change of a torque during material charge, whereby wasteful power consumption can be restrained, and power consumption can be restrained while maintaining excellent shutter characteristics.

In addition, according to a ninth aspect of the present invention, in order to achieve the foregoing object, there is provided a material supply and discharge apparatus according to the first or second aspect, wherein the shutter control portion (19a) comprises:

a motor control portion (20) for outputting a motor drive signal and a hold current control signal based on a hopper release signal from a main control portion (18);

a voltage output circuit (22a) for outputting a current limit signal based on the hold current control signal from the motor control portion; and a motor driver circuit (21a) for supplying a drive signal based on the motor drive signal from the motor control portion and the current limit signal from the voltage output circuit.

In addition, according to a tenth aspect of the present invention, in order to achieve the foregoing object, there is provided a material supply and discharge apparatus according to the ninth aspect, wherein, when the hold current control signal from the motor control portion is composed of a first hold current control signal and a second hold current control signal, the voltage output circuit (22a) comprises:

a first transistor (26) that is electrically conductive during a period when the first hold current control signal is inputted from the motor control portion;

first resistance means (25) for, when the first transistor is electrically conductive, providing a first current limit signal;

a second transistor (28) that is electrically conductive during a period when the second hold current control signal is inputted from the motor control portion; and second resistance means (27) for, when the second transistor is electrically conductive, providing a second current limit signal, wherein the motor driver circuit (21a) changes a current value of the hold current supplied to the motor based on the first and second current limit signal.

In addition, according to an eleventh aspect of the present invention, in order to achieve the foregoing object, there is provided a material supply and discharge apparatus according to the first or second aspect, wherein the shutter control portion (19a) comprises:

a motor control portion (20) for outputting a motor drive signal, a hold current control signal, and a current adjusting signal based on a hopper release signal from a main control portion (18);

a voltage output circuit (22a) for outputting a current limit signal based on the hold current control signal from the motor control portion;

a motor driver circuit (21a) for supplying a drive signal to the motor based on a motor drive signal from the motor control portion and the current limit signal from the voltage output circuit; and a current adjuster circuit (30) for adjusting the current limit signal caused by the voltage output circuit based on the current adjusting signal from the motor control portion.

In addition, according to a twelfth aspect of the present invention, in order to achieve the foregoing object, there is provided a material supply and discharge apparatus according to the eleventh aspect, wherein, when the hold current control signal from the motor control portion is composed of a first hold current control signal and a second hold current control signal, the voltage output circuit (22a) comprises:

a first transistor (26) that is electrically conductive during a period when the first hold current control signal is inputted from the motor control portion;

a first variable resistor (25a) for, when the first transistor is electrically conductive, providing a first current limit signal;

a second transistor (28) that is electrically conductive during a period when the second hold current control signal is inputted from the motor control portion; and a second variable resistor (27a) for, when the second transistor is electrically conductive, providing a second current limit signal, wherein the current adjuster circuit (30) varies the first and second variable resistance based on the current adjusting signal, thereby adjusting the first and second current limit signal, and wherein the motor drive circuit (21a) changes a current value of the hold current supplied to the motor based on the first and second current limit signal.

BEST MODE FOR CARRYING OUT OF THE INVENTION

Hereinafter, preferred embodiments of the present invention will be described with reference to the accompanying drawings.

(First Embodiment)

Figure 1A:
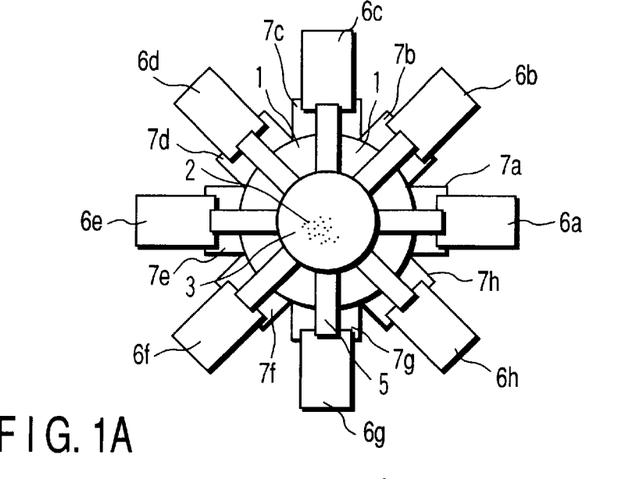
FIGS. 1A, 1B, and 1C are a plan view, a side view, and a partial view showing a schematic configuration of a combination weighing device incorporated by a material supply and discharge apparatus according to a first embodiment of the present invention, respectively.
Figure 1B:
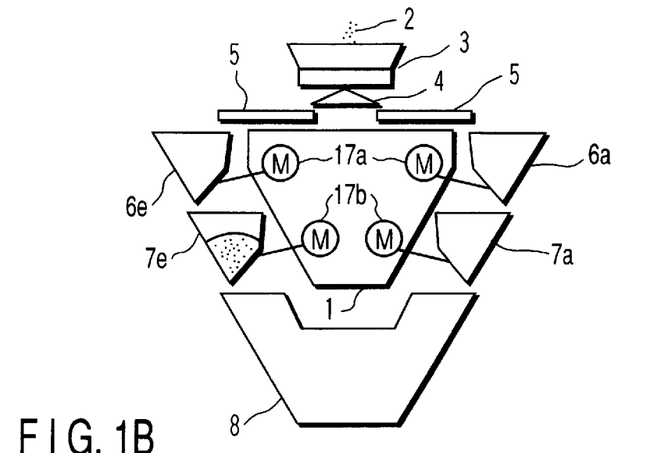
Figure 1C:
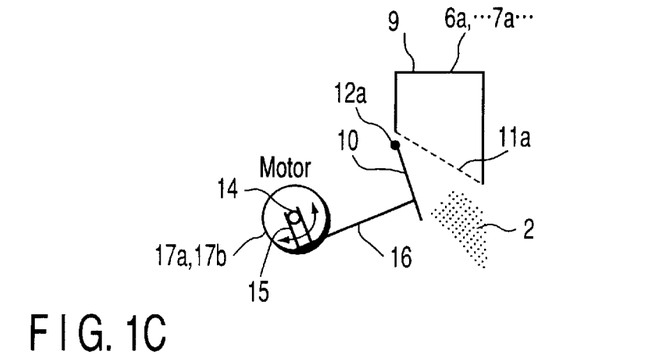

FIGS. 1A, 1B, and 1C are views each showing a schematic configuration of a combination weighing device incorporated by a material supply and discharge apparatus according to a first embodiment of the present invention.

FIG. 1A is a top view of the combination weighing device.

FIG. 1B is a schematic cross section of the combination weighing device.

FIG. 1C is a schematic cross section of each hopper in FIGS. 1A and 1B.

In FIGS. 1A, 1B, and 1C, like elements of the conventional weighing device shown in FIG. 9A are designated by like reference numerals. A duplicate detailed description is omitted here.

In the combination weighing device according to the first embodiment, materials 2 collected by a funnel 3 are dispersed in a radiation manner by means of a dispersion feeder 4 provided at the lower part of the funnel 3. The thus dispersed materials are then supplied to a plurality of stock hoppers 6a, 6b, . . . 6h (eight hoppers in this case) arranged along the peripheral face of a reverse cone shaped frame 1 by means of a plurality of forwarding feeders 5 arranged in a radiation manner on the frame 1.

The materials 2 supplied to the stock hoppers 6a, 6b, . . . 6h each are temporarily held by the stock hoppers 6a, 6b, . . . 6h. Then, as shown in FIG. 1C described later, shutters 10 are provided respectively at the bottom of each of the stock hoppers 6, whereby the materials are moved to eight weighing hoppers 7a, 7b, . . . 7h provided downwardly of each of the stock hoppers 6a, 6b, . . . 6h.

The weight of each of the materials moved to these weighing hoppers 7a, 7b, . . . 7h is weighted for each of the weighing hoppers 7a, 7b, . . . 7h.

That is, the weight value of such each material 2 carried inside of a respective one of a plurality of weighing hoppers 7a, 7b, . . . 7h is weighed by means of a respective of the plurality of weighing hoppers 7a, 7b, . . . 7h arranged along the peripheral face of the reverse cone shaped frame 1.

Then, there are selected weighing hoppers 7a, 7b, . . . 7h each housing materials each of which a total weight value obtained when the weight values of the materials 2 each are combined for each of the weighing hoppers 7a, 7b, . . . 7h coincides with a predetermined weight value or is within the range of a predetermined tolerance.

Then, as shown in FIG. 1C described later, shutters 10 are provided respectively at the bottom of each of the weighing hoppers 7a, 7b, . . . 7h are released, whereby materials 2 each are guided to a collection shoot 8 provided downwardly of each of the selected weighing hoppers 7a, 7b, . . . 7h.

Therefore, a bag (not shown) is placed downwardly of this collection shoot 8, whereby materials 2 each are housed in that bag by a predetermined weight value, and are automatically packed.

The funnel 3, dispersion feeder 4, and a plurality of forwarding feeder 5 configure a material supply mechanism for supplying (dropping) materials 2 in each of the stock hoppers 6a, 6b, . . . 6h.

The stock hoppers 6a, 6b, . . . 6h configure a material supply mechanism for supplying (dropping) materials 2 in each of the weighing hoppers 7a, 7b, . . . 7h positioned downwardly of the stock hoppers 6a, 6b, . . . 6h.

FIG. 1C is a schematic cross section representing one of the stock hoppers 6a, 6b, . . . 6h and one of the weighing hoppers 7a, 7b, . . . 7h.

The stock hoppers 6a, 6b, . . . 6h each and the weighing hoppers 7a, 7b, . . . 7h each have a receptacle port 9 for materials 9 at an upper end, and has a discharge port 11a for materials 2 at a lower end.

One end of the previously described shutter 10 for opening and closing the discharge port 11a is pivoted at a shaft 12a provided at one end of this discharge port 11a.

In addition, one end of a rod 16 is pivoted at a tip end of a crank 15 mounted on a rotary shaft of each of 16 stepping motors 17a and 17b installed in the frame 1 (only four motors shown).

The other end of this rod 16 is pivoted on the outer surface of a respective one of the shutters 10 of each of the stock hoppers 6a, 6b, . . . 6h and each of the weighing hoppers 7a, 7b, . . . 7h.

Therefore, when a rotary shaft 14 of each of the stepping motors 17a and 17b is fully rotated, as shown in FIGS. 5A to 5H, each shutter 10 changes its state from a closed state to an opened state of the discharge port 11a, and further, changes its state from the opened state to the closed state.

Therefore, in order to move (drop) materials 2 each housed in each of the stock hoppers 6a, 6b, . . . 6h and each of the weighing hoppers 7a, 7b, . . . 7h downwardly of a discharge port 11a, the rotary shaft 14 of each of the stepping motors 17a and 17b may be fully rotated.

Figure 2:
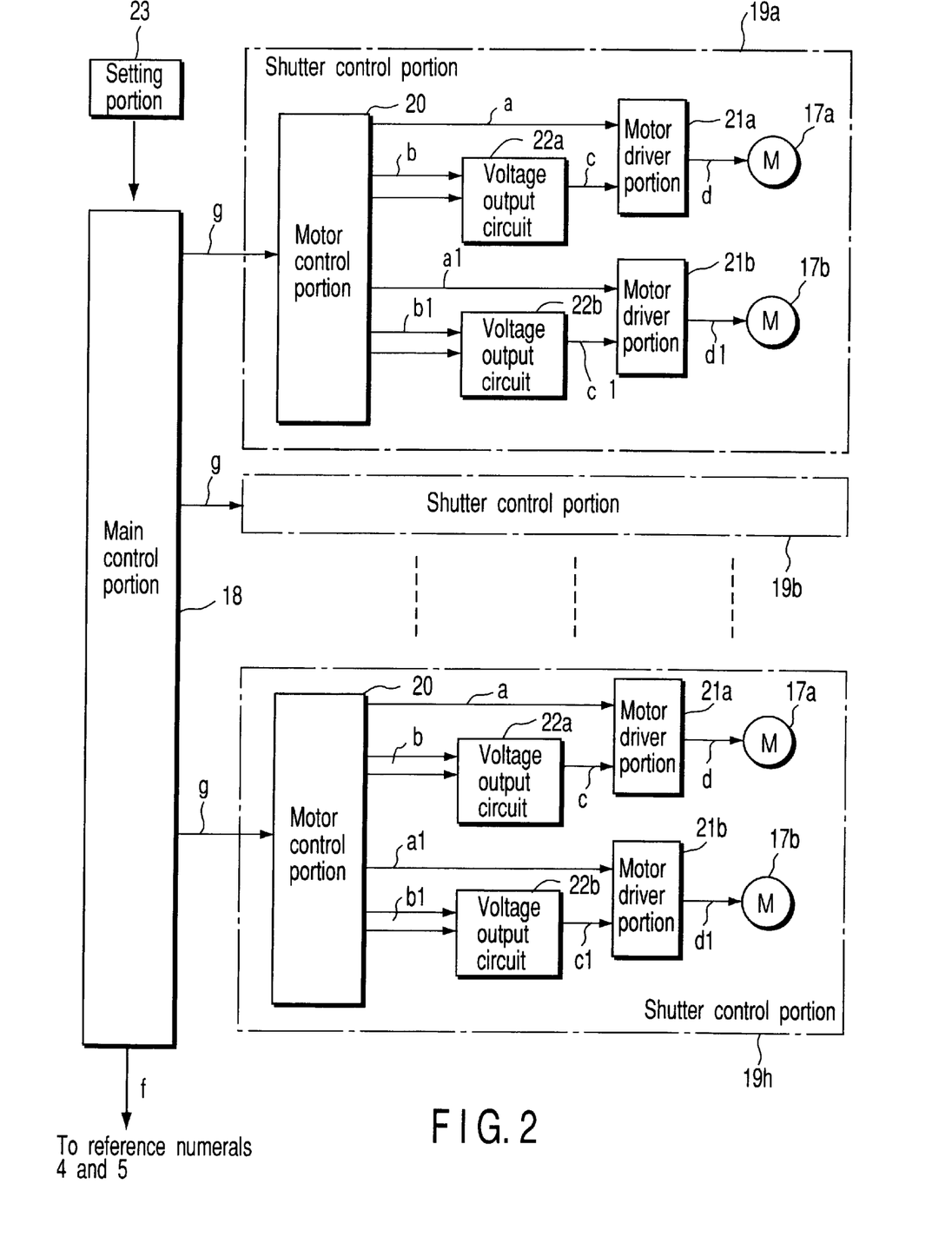
FIG. 2 is a block diagram depicting a circuit configuration of a combination weighing device incorporated by the material supply and discharge apparatus according to the first embodiment of the present invention.

FIG. 2 is a block diagram depicting a circuit configuration for carrying out an opening and closing control relevant to each of the shutters 10 in each of the stock hoppers 6a, 6b, . . . 6h and each of the weighing hoppers 7a, 7b, . . . 7h.

That is, to a main control portion 18 that consists of a computer for controlling an operation of the entire combination weighing device, as shown in FIG. 1A, there are connected a plurality of shutter control portions 19a, 19b, . . . 19g for controlling an opening and closing operation of shutters 10 in each of the stock hoppers 6a, 6b, . . . 6h and each of the weighing hoppers 7a, 7b, . . . 7h arranged along the peripheral face of the reverse cone shaped frame 1.

In the first embodiment, eight shutter control portions 19a, 19b, . . . 19h are connected to the main control portion 18.

Here, the main control portion 18 delivers a feeder signal "f" to the dispersion feeder 4 and the forwarding feeder 5, and delivers a hopper release signal "g" to each of the shutter control portions 19a, 19b, . . . 19h.

In addition, various setting information is inputted from a setting portion 23 to the main control portion 18.

In each of the shutter control portions 19a, 19b, . . . 19h, energizing phases are sequentially changed from a motor control portion 20 to a motor drive circuit 21a of a stepping motor 17a for each of the stock hoppers 6a, 6b, . . . 6h, and then, a drive pulse signal "a" for rotating the stepping motor 17a is applied.

In addition, when the stepping motor 17a is inactive, a hold current control signal "b" is inputted from the motor control portion 20 to the voltage output circuit 22a.

This voltage output circuit 22a delivers to the motor drive circuit 21a a current limit signal "c" that corresponds to the inputted hold current control signal "b".

When a drive pulse signal "a" is inputted from the motor control portion 20, this motor drive circuit 21a delivers to the stepping motor 17a a drive signal for rotatably driving the stepping motor 17a at a speed according to a pulse period of this drive pulse signal "a".

Further, when the stepping motor 17a is inactive, the motor drive circuit 21a applies to the stepping motor 17a a hold current according to the current limit signal "c" from the voltage output circuit 22a.

Similarly, from the motor control portion 20, a drive pulse signal $a_1$ is applied to a motor drive circuit 21b of the stepping motor 17b for each of the weighing hoppers 7a, 7b, . . . 7h.

In addition, when the stepping motor 17b is inactive, a hold current control signal $b_1$ is inputted from the motor control portion 20 to the voltage output circuit 22b.

This voltage output circuit 22b delivers to the motor control circuit 21b a current limit signal $c_1$ that corresponds to the inputted hold current control signal $b_1$.

This motor control circuit 21b rotatably drives the stepping motor 17b at a speed according to a pulse period of the drive pulse signal $a_1$, and applies to the stepping motor 17b a hold current according to the current limit signal $c_1$.

Figures 4A, 4B:
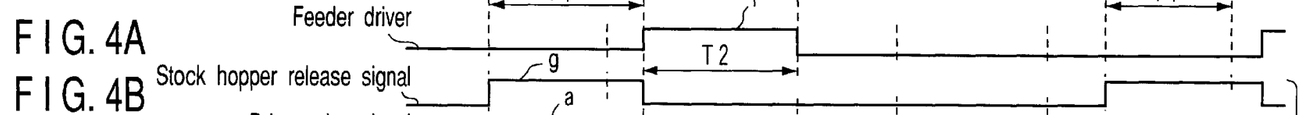
FIGS. 4A to 4M are time charts each illustrating a shutter opening and closing control operation of the combination weighing device incorporated by the material supply and discharge apparatus according to the first embodiment of the present invention.
Figure 4C:
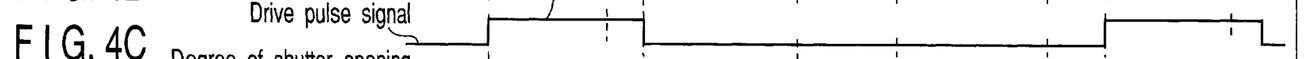
Figure 4D:
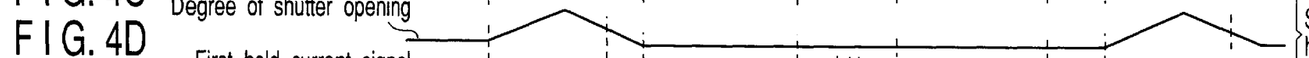
Figure 4E:
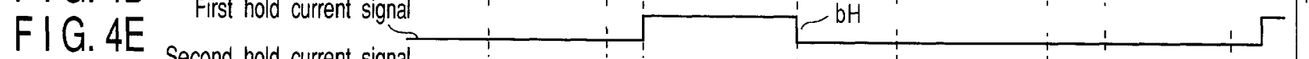
Figure 4F:
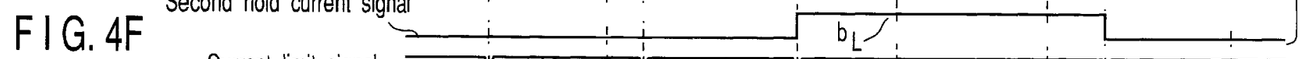
Figure 4G:
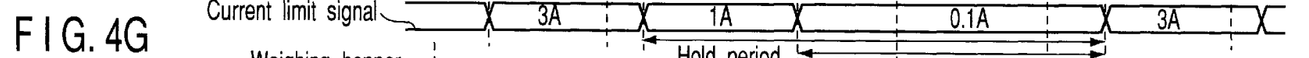
Figures 4H, 4I, 4J:
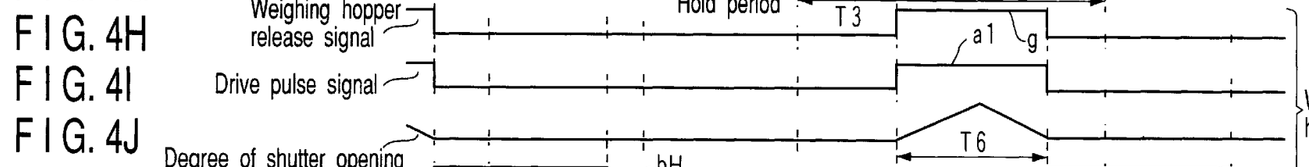
Figures 4K, 4L:
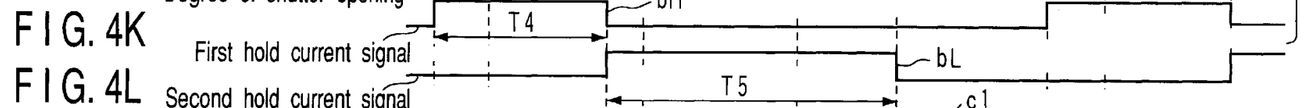
Figure 4M:
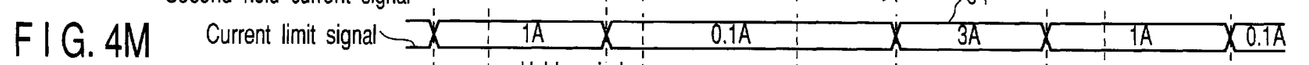
Figure 5A:
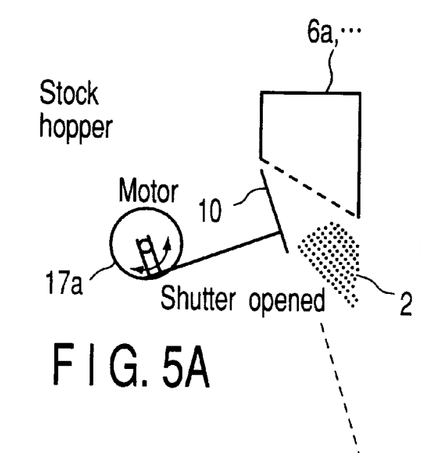
FIGS. 5A to 5H are views each illustrating a shutter opening and closing operation in each hopper of the combination weighing device incorporated by the material supply and discharge apparatus according to the first embodiment of the present invention.
Figure 5B:
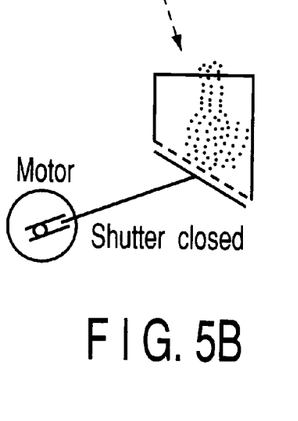
Figure 5C:
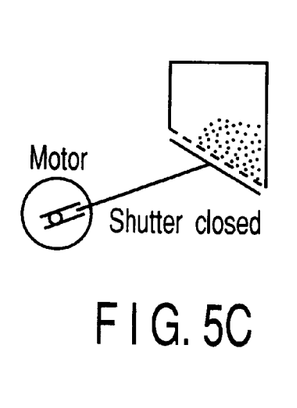
Figure 5D:
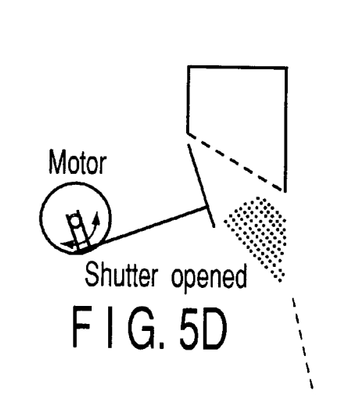
Figures 5E, 5F:
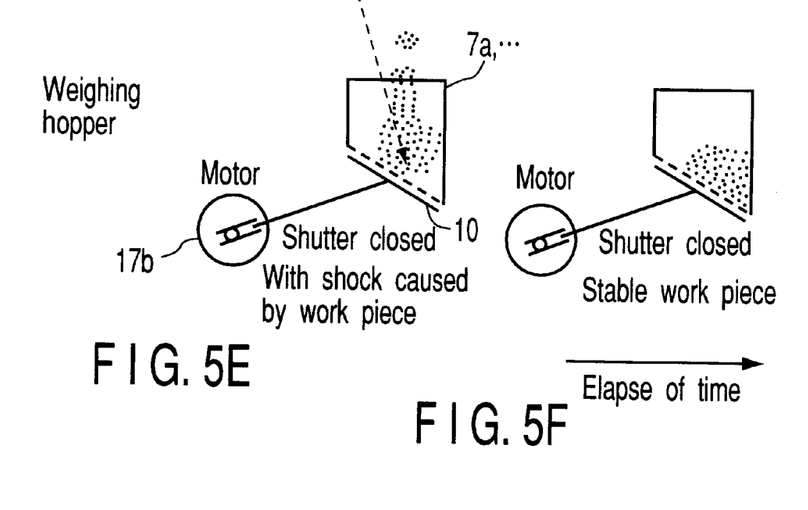
Figure 5G:
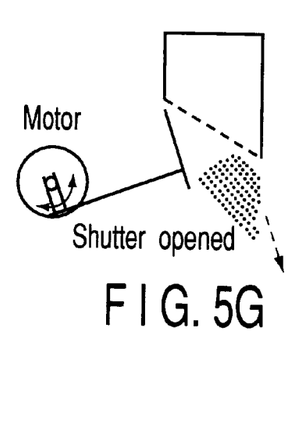
Figure 5H:
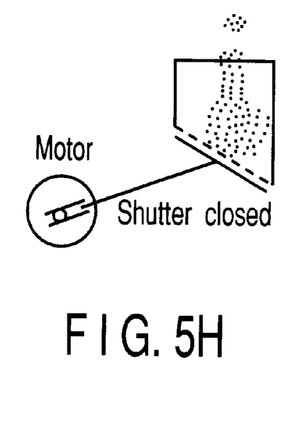

Therefore, as shown in FIGS. 4G and 4M, when the stepping motors 17a and 17b are inactive, if voltage values of the current limit signals "c" or "$c_1$" each are high, it denotes that a large amount of hold current flows.

Figure 3:
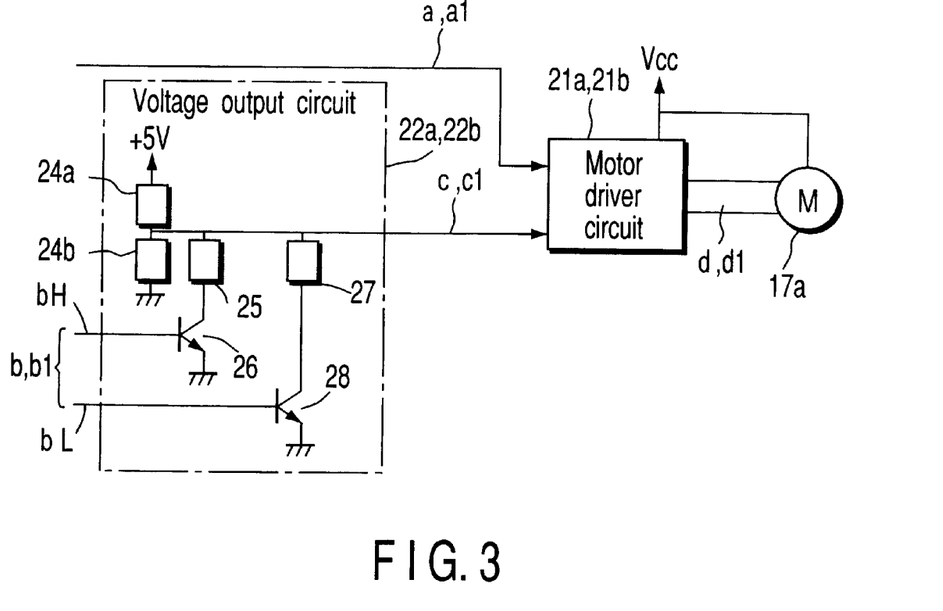
FIG. 3 is a block diagram depicting an internal configuration of a voltage output circuit shown in FIG. 2.

The voltage output circuits 22a and 22b for outputting such current limit signals "c" and "$c_1$" are configured, respectively, as shown in FIG. 3.

That is, the hold current control signals "b" and "$b_1$" are composed of a first hold current control signal $b_H$ and a second hold current control signal $b_L$.

In the voltage output circuits 22a and 22b shown in FIG. 3, during a period when the first hold current control signal $b_H$ is inputted, a first transistor 26 is electrically conductive. Then, a voltage of the current limit signal "c" voltage divided by a voltage dividing resistors 24a and 24b is pulled down at a resistor 25.

In addition, during a period when the second hold current control signal $b_L$ is inputted, a second transistor 28 is electrically conductive. Then, a voltage of the current limit signal "c" voltage divided by the voltage dividing resistors 24a and 24b is pulled down at a resistor 27.

Here, the resistance value of the resistor 25 is set to be greater than that of the resistor 27.

Therefore, a current value of the first hold current applied to the stepping motors 17a and 17b during a period when the first hold current control signal $b_H$ is inputted, is greater than that of the second hold current applied to the stepping motors 17a and 17b during a period when the second current control signal $b_L$ is inputted.

Now, a shutter control operation of each of the thus configured shutter control portions 19a, 19b, . . . 19b will be described with reference to the timing charts shown in FIGS. 4A to 4M.

First, a control operation of each of the shutters 10 relevant to each of the stock hoppers 6a, 6b, . . . 6h at the upper stage will be described here.

At a time $t_1$, from the main control portion 18, as shown in FIGS. 4B and 4C, a stock hopper release signal "g" corresponding to each of the stock hoppers 6a, 6b, . . . 6h is inputted, whereby a drive pulse signal "a" is started to be outputted from a motor control portion 20 to a motor drive circuit 21.

Then, a stepping motor 17a starts a rotating operation, whereby, the shutter 10 of each of the stock hoppers 6a, 6b, . . . 6h starts a release operation, as shown in FIG. 4D.

Then, at a time $t_3$ after a release period $T_1$ has elapsed, when the stock hopper release signal "g" falls, an output of the drive pulse signal "a" from the motor control portion 20 is stopped, whereby the stepping motor 17a is stopped, and the shutter 10 of each of the stock hoppers 6a, 6b, . . . 6h is closed.

In this case, at the release period $T_1$, a drive current 3A, for example, is supplied to the stepping motor 17a, as shown in FIG. 4D.

At a time $t_3$, when the shutter 10 of each of the stock hoppers 6a, 6b, . . . 6h is closed, as shown in FIG. 4A, a feeder signal "f" is started to be outputted from the main control portion 18 to the forwarding feeder 5. At the same time, as shown in FIG. 4E, a first hold current control signal $b_H$ is started to be outputted from the motor control portion 20 to the voltage output circuit 22a.

In this manner, as shown in FIG. 4G, to an inactive stepping motor 17a, there is supplied a first hold current value (for example, 1 A) capable of applying to the shutter 10 a torque sufficient to bear the shock during charge of the materials 2 as the hold current applied to the stepping motor 17a from the start time for loading relevant to the shutter 10 caused by the materials 2 dropped from the material supply mechanism to each of the stock hoppers 6a, 6b, . . . 6h to a predetermined period $T_2$.

Then, when a feeder signal "f" rises at a time $t_4$ after the period $T_2$ has been elapsed, a first hold current control signal $b_H$ falls. Then, as shown in FIG. 4F, a second hold current control signal $b_L$ is started to be outputted from the motor control portion 20 to the voltage output circuit 22a.

In this manner, as shown in FIG. 4G, after the materials each 2 has been received by each of the stock hoppers 6a, 6b, . . . 6h, at a period $T_3$ from an elapse of the predetermined period $T_2$ to a time interval from $t_4$ to $t_7$ for starting discharging from a discharge port 11a of each of the stock hoppers 6a, 6b, . . . 6h, a second hold current value (for example, 0.1 A) is supplied, the second hold current value being smaller than the first hold current value capable of applying each of the shutters 10 a torque against a force of which each of the shutters 10 is released downwardly when a load is applied to the gravity direction of the materials 2, as a hold current applied to the stepping motor 17a.

Then, at a time $t_7$ after the period $T_3$ has elapsed, when the second hold current control signal $b_L$ falls, the shutter 10 of each of the stock hoppers 6a, 6b, . . . 6h starts a release operation at the next cycle, as shown in FIGS. 4B, 4C, and 4D.

Now, a description will be given with respect to a control operation of each of the shutters 10 relevant to each of the weighing hoppers 7a, 7b, . . . 7h at the lower stage, associated with the shutter control relevant to each of the stock hoppers 6a, 6b, . . . 6h.

First, at a period $T_4$ from a time $t_0$ immediately before the shutter 10 of each of the stock hoppers 6a, 6b, . . . 6h at the upper stage is started to be released to a time $t_2$ immediately before the shutter 10 of each of the stock hoppers 6a, 6b, . . . 6h is closed, as shown in FIG. 4K, when the stepping motor 17b is inactive, the first hold current control signal $b_H$ is outputted from the motor control portion 20 to the voltage output circuit 22b.

In this manner, as shown in FIG. 4M, to an inactive stepping motor 17b, there is supplied a first hold current value (for example, 1 A) capable of applying to each of the shutters 10 of each of the weighing hoppers 7a, 7b, . . . 7h a torque sufficient to bear the shock during charge of the materials 2 as the hold current applied to the stepping motor 17b from the start time for loading relevant to the shutter 10 caused by the materials 2 dropped from each of the stock hoppers 6a, 6b, . . . 6h into the each of the weighing hoppers 7a, 7b, . . . 7h to the predetermined period $T_4$.

Then, when this first hold current control signal $b_H$ falls at the time $t_2$, as shown in FIG. 4L, the second hold current control signal $b_L$ is started to be outputted from the motor control portion 20 to the voltage output circuit 22b.

In this manner, as shown in FIG. 4M, at a period $T_5$ from $t_2$ to $t_5$, from an elapse of the predetermined period $T_4$ after the materials each have been received by each of the weighing hoppers 7a, 7b, . . . 7h to the start of discharging the materials 2 from the discharge port 11a of each of the stock hoppers 6a, 6b, . . . 6h, a second hold current value (for example, 0.1 A) is supplied, the second hold current being smaller than the first hold current value capable of applying each of the shutters 10 of each of the weighing hoppers 7a, 7b, . . . 7h a toque against a force released downwardly under a load in the gravity direction of the materials 2, as a hold current applied to the stepping motor 17b.

Then, at a time $t_5$ after the period $T_5$ has elapsed, when the second hold current control signal $b_L$ falls, as shown in FIG. 4H, a weighing hopper release signal "g" relevant to each of the weighing hoppers 7a, 7b, . . . 7h is inputted from the main control portion 18 to the motor control portion 20.

In this manner, as shown in FIG. 4I, a drive pulse signal $a_1$ is started to be outputted from the motor control portion 20 to the motor drive circuit 21b.

Then, as shown in FIG. 4I, the stepping motor 17b starts a rotating operation, whereby the shutter 10 of each of the weighing hoppers 7a, 7b, . . . 7h starts a release operation.

Then, at a time $t_6$ after a period $t_6$ has elapsed, when a weighing hopper release signal falls, an output of the drive pulse signal $a_1$ is stopped, whereby the shutter of each of the weighing hoppers 7a, 7b, . . . 7h is closed.

In this case, at the release period T6, a drive current 3A, for example, is supplied to the stepping motor 17b, as shown in FIG. 4M.

FIGS. 5A to 5H are schematic views each showing a relationship between an operation of each of the stock hoppers 6a, 6b, . . . 6h and an operation of each of the weighing hoppers 7a, 7b, . . . 7h achieved by the time charts shown in FIGS. 4A to 4M.

As shown in FIGS. 5A to 5H, it is understandable that an opening and closing operation of the shutter 10 of each of the weighing hoppers 7a, 7b, . . . 7h is carried out to be slightly slower than that of the shutter 10 of each of the stock hoppers 6a, 6b, . . . 6h.

That is, during a period when the shutter 10 of each of the stock hoppers 6a, 6b, . . . 6h is released, and the materials 2 are dropped, the shutter 10 of each of the weighing hoppers 7a, 7b, . . . 7h is closed.

In a combination weighing device incorporated by the thus configured material supply and discharge apparatus according to the first embodiment, when materials 2 are started to be supplied (dropped), from the forwarding feeder 5 to each of the stock hoppers 6a, 6b, . . . 6h, a first hold current flows the stepping motor 17a in which the shutter 10 of each of the stock hoppers 6a, 6b, . . . 6h is closed.

This first hold current has a current value capable of maintaining a holding force sufficient to bear the shock at the start of loading when the materials 2 are dropped to the shutter 10 of each of the stock hoppers 6a, 6b, . . . 6h.

Therefore, due to the shock, the materials 2 are not dropped downwardly without the release of the shutter 10 of each of the stock hoppers 6a, 6b, . . . 6h.

Then, at a time when the supply (drop) of the materials 2 from the forwarding feeder 5 to each of the stock hoppers 6a, 6b, . . . 6h is almost finished, the second hold current flows the stepping motor 17a in which the shutter 10 of each of the stock hoppers 6a, 6b, . . . 6h is closed.

At this period, the weight of each of the materials 2 housed in each of the stock hoppers 6a, 6b, . . . 6h is merely loaded to the shutter 10 of each of the stock hoppers 6a, 6b, . . . 6h.

Therefore, this second hold current can be reduced from 1 A to 0.1 A described previously, which is about 1/6 to 1/8, and is further 1/10, as compared with the first hold current to which the shock is applied.

Therefore, the power consumption quantity of the entire combination weighing device can be reduced.

In addition, an operation of the shutter 10 of each of the weighing hoppers 7a, 7b, . . . 7h to which the materials 2 from each of the stock hoppers 6a, 6b, . . . 6h are supplied (dropped) can provide a substantially similar advantageous effect.

In the present embodiment, each of the shutter control portions 19a, 19b, . . . 19h controls an operation so as to set the hold current applied to the motor from the start time for loading relevant to the shutter caused by the materials dropped from the material supply mechanism to the predetermined period, to a first hold current time capable of applying to the shutter a torque sufficient to bear the shock during charge of the materials, and to set a hold current applied to the motor from the elapse of the predetermined period after the materials have been received by the hopper to the start of discharging the materials from the discharge port of the hopper, to a second hold current value that is smaller than the first hold current value capable of applying to the shutter a torque against a force released downwardly under a load in the gravity direction of the materials.

Hence, each of such shutter control ports 19a, 19b, . . . 19h may control the hold current value so that an average current value of the hold currents applied to the motor is smaller in a period from reception of the materials by the hopper to the start of discharging the materials from the discharge port of the hopper, as compared with a hold current value relevant to the motor at the start of loading relevant to the shutter caused by the materials dropped from the material supply mechanism.

(Second Embodiment)

Figure 6:
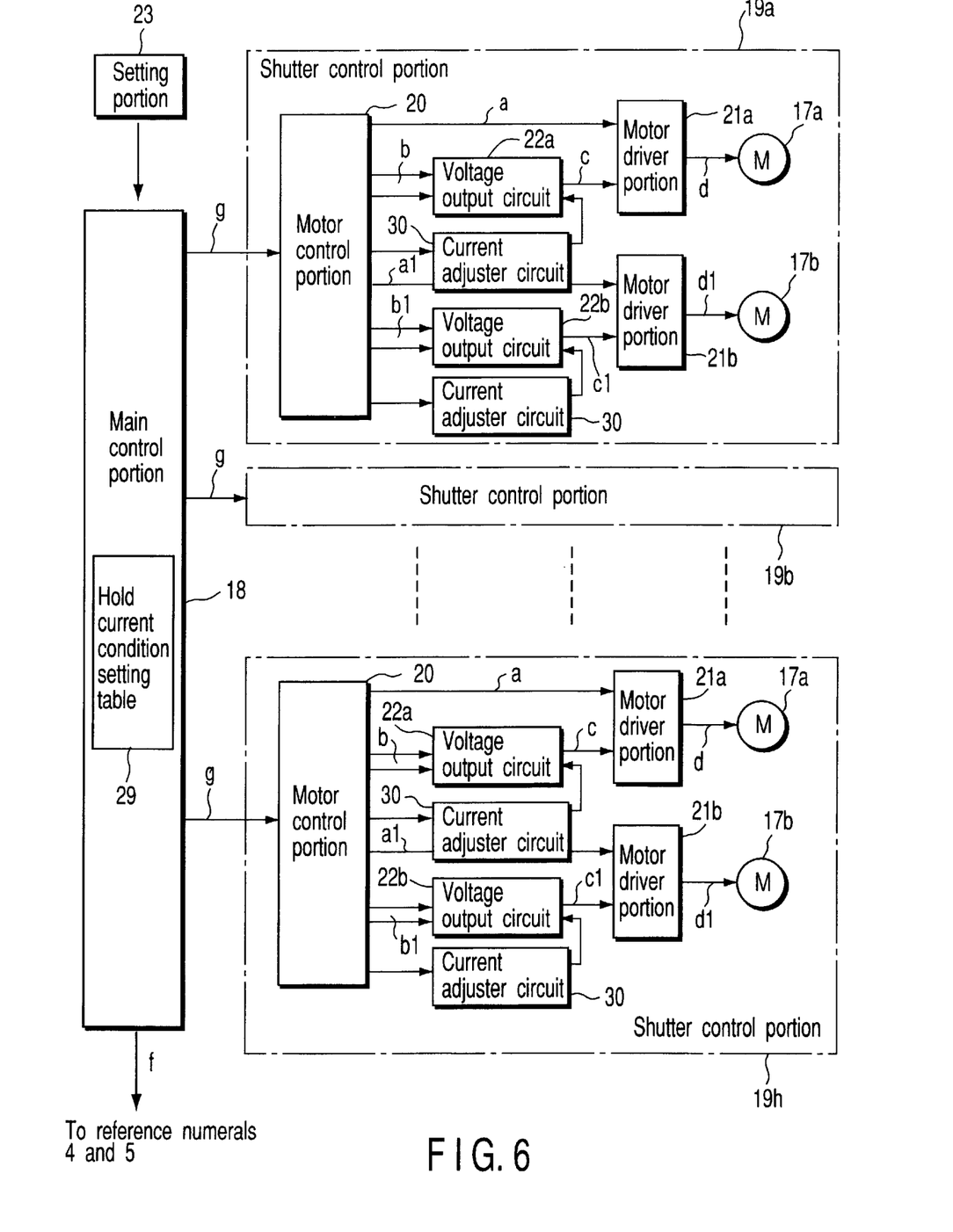
FIG. 6 is a block diagram depicting a circuit configuration of the combination weighing apparatus incorporated by a material supply and discharge apparatus according to a second embodiment of the present invention.

FIG. 6 is a block diagram depicting a circuit configuration for carrying out opening and closing control relevant to each of the shutters 10 of each of the stock hoppers 6a, 6b, . . . 6h and each of the weighing hoppers 7a, 7b, . . . 7h in a combination weighing device incorporated by a material supply and discharge apparatus according to a second embodiment of the present invention.

In FIG. 6, like elements of the circuit block diagram according to the first embodiment shown in FIG. 2 are designated by line reference numerals. A duplicate detailed description is omitted here.

In the second embodiment, a hold current condition setting table 29 is provided inside of the main control portion 18.

Further, a current adjuster circuit 30 is incorporated in each of the shutter control portions 19a, 19b, . . . 19h.

Here, the hold current condition setting table 29 stores a current value of a first hold current and a period $T_2$ of applying the first hold current and a current value of a second hold current and a period $T_3$ of applying the second hold current or the like.

The types of materials 2 include physical attributes of materials such as the weight, shape, and specific gravity of each material or a total weight of materials to be housed one time in one hopper, the physical attributes being a milestone of a shock during material drop or a static weight after dropped.

Then, if an operator specifies type of material 2 to be weighed by operating a setting portion 2 before actually starting weighing, the main control portion 18 reads out a current value of a first hold current of type specified by the hold current condition setting table 29 and a period $T_2$ of applying the first hold current; a current value of a second hold current and a period $T_3$ of applying the second hold current, and delivers them to each of the shutter control portions 19a, 19b, . . . 19h.

The motor control portion 20 of each of the shutter control portion 19a, 19b, . . . 10h sets the period $T_2$ of applying the first holding current and the period $T_3$ of applying the second hold current to a period specified by the main control portion 18, and delivers the current value of the first hold current and the current value of the second current value to a current adjuster circuit 30.

Figure 7:
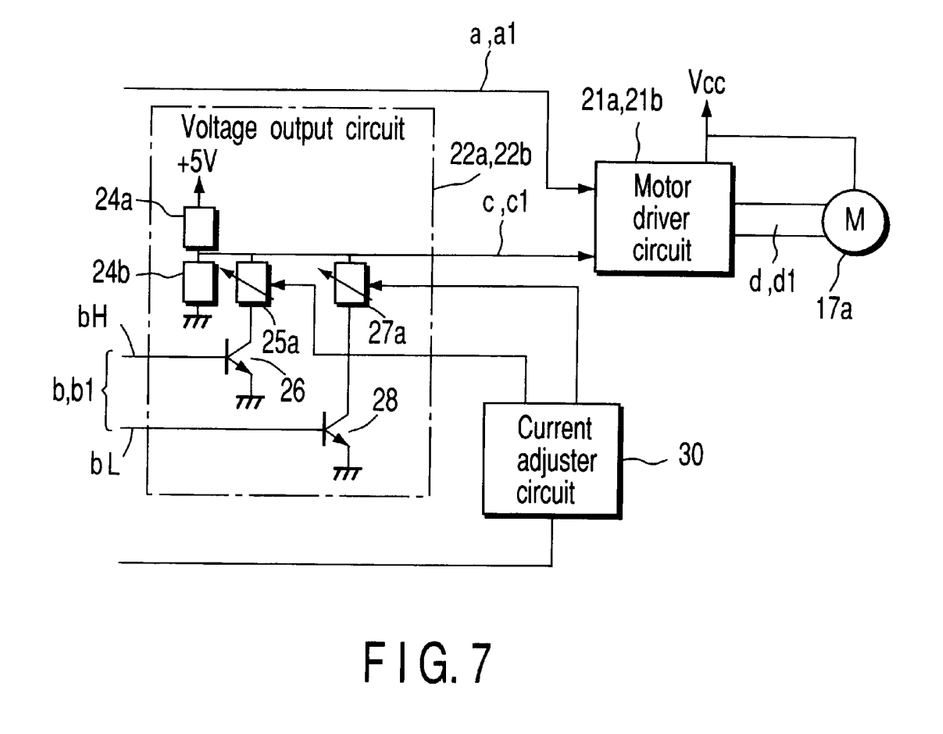
FIG. 7 is a block diagram depicting an internal configuration of a voltage output circuit shown in FIG. 6.

FIG. 7 is a detailed circuit diagram depicting voltage output circuits 22a and 22b of each of the shutter control portions 19a, 19b, . . . 19h according to the second embodiment.

In the voltage output circuits 22a and 22b according to the second embodiment, the resistors 25 and 27 each in the voltage output circuits 22a and 22b according to the first embodiment shown in FIG. 3 are replaced with variable resistors 25a and 27a.

Then, the voltage adjuster circuit 30 adjusts the resistance value of each of the pull-down variable resistors 25a and 25b is adjusted so that the voltage limit signals "c" and "$c_1$" are obtained as values that correspond to the current value of the first hold current and the current value of the second hold current that are specified by the motor control portion 30.

When an operator activates this combination weighing device after the above condition setting process has completed, the current value of the hold current of the stepping motors 17a and 17b each and the applying period are automatically controlled in accordance with the set condition.

In the thus configured combination weighing device incorporated by the material supply and discharge apparatus according to the second embodiment, each of the shutter control portions 19 can set the maximum first and second hold current values and the periods of applying the first and second hold currents as each of the hold currents of the stepping motors 17a and 17b according to type of material indicating physical attributes of materials to be weighed. Thus, power consumption of the entire apparatus can be reduced to its required minimum under a given condition.

For example, under the condition where a total weight of a plurality of materials 2 to be housed in one hopper is equal to a predetermined weight, in the case where the weight of one material 2 is greater, the shock becomes larger. Thus, a ratio between the current value of the first hold current and the current value of the second hold current is highly set.

In addition, in the case where the weight of one material 2 is smaller, the shock becomes smaller. Thus, a ratio between the current value of the first hold current and the current value of the second hold current is lowly set.

In addition, in the case where the weight of one material 2 is greater, the shock and vibration become greater. Thus, a time for applying the first hold current is set to be longer.

In addition, in the case where the weight of one material 2 is smaller, the shock and vibration become smaller. Thus, a time for applying the first hold current is set to be shorter.

When the current adjuster circuit 30 and voltage output circuits 22a and 22b shown in FIG. 7 are composed of a D/A converter, the voltage limit signals "c" and "$c_1$" specified by the motor control portion 20 via the D/A converter may be delivered to the motor drive circuits 21a and 21b when the first and second hold current signals $b_H$, $b_L$ are inputted.

(Third Embodiment)

FIGS. 8A to 8E are time charts each showing a shutter opening and closing operation of each of the stock hoppers 6a, 6b, . . . 6h and each of the weighing hoppers 7a, 7b, . . . 7h caused by the shutter control portion in the combination weighing device incorporated by a material supply and discharge apparatus according to a third embodiment of the present invention.

A configuration other than shutter opening and closing operation of each of the stock hoppers 6a, 6b, . . . 6h and each of the weighing hoppers 7a, 7b, . . . 7h caused by this shutter control portion 19 is identical to that of the combination weighing device according to the second embodiment. A description of this configuration is omitted here.

In the time charts shown in FIGS. 8A to 8E, the release period T1 of the shutters 10 in each of the stock hoppers 6a, 6b, . . . 6h and each of the weighing hoppers 7a, 7b, . . . 7h is divided into an opening operation period and a closing operation period.

Figure 8A:
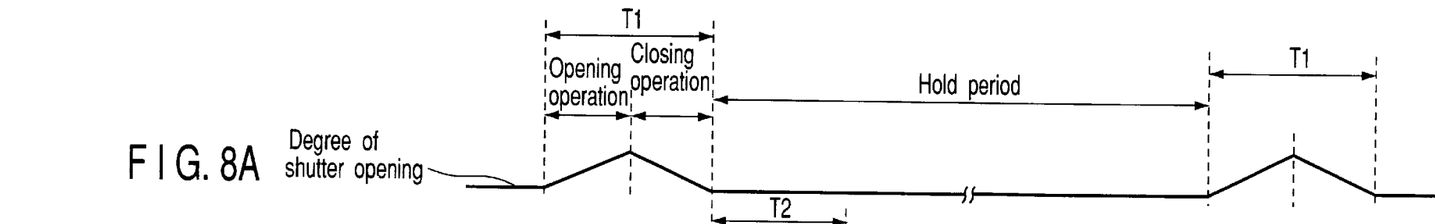
FIGS. 8A to 8E are time charts each illustrating a shutter opening and closing control operation of a combination weighing device incorporated by a material supply and discharge apparatus according to a third embodiment of the present invention.

FIG. 8A shows a degree of the shutter opening of each hopper.

Figure 8B:
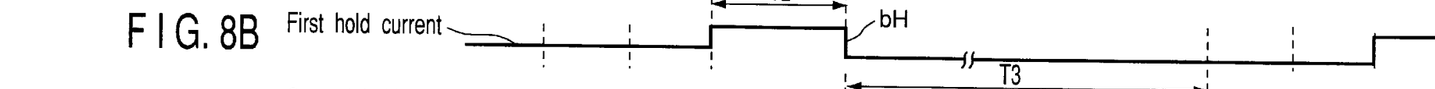

FIG. 8B shows a first hold current relevant to the stepping motors 17a and 17b.

Figures 8C, 8D:
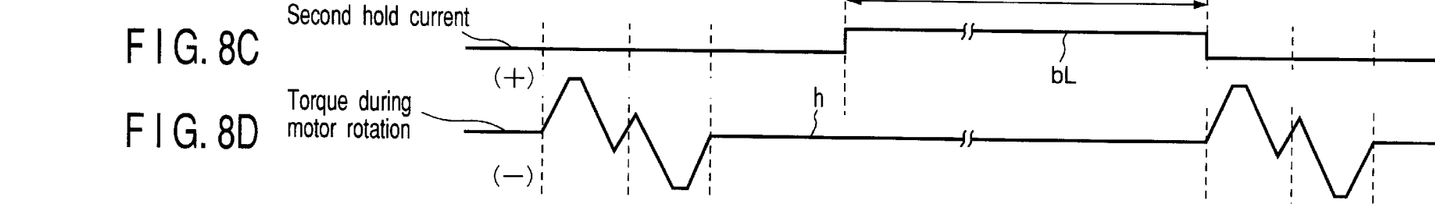

FIG. 8C shows a second hold current relevant to the stepping motors 17a and 17b.

FIG. 8D shows torque characteristics "h" required for the stepping motors 17a and 17b.

Figure 8E:
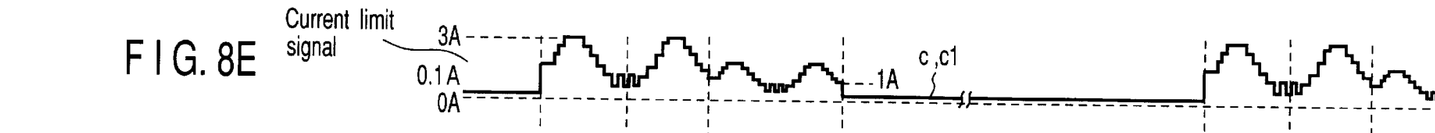

FIG. 8E shows a current limit signal relevant to the stepping motors 17a and 17b.

In order to smoothly carry out an opening and closing operation in the shutter 10 of each hopper, the torque characteristic "h" required for the stepping motors 17a and 17b is obtained as a large value at an initial portion of the closing operation period and at an initial portion of the closing operation period.

With respect to the shutter 10 of each hopper, the torque value is substantially 0 at an intermediate point between the opening operation period in which the turning direction is inverted and the closing operation period.

Therefore, the energizing current supplied to the stepping motors 17a and 17b may be controlled to be indicated as a release period $T_1$ of the shutter 10 in FIG. 8E so as to be changed according to this torque characteristic "h".

The shutter 10 of each hopper turns in a reverse direction when it is closed. Thus, the polarity of the torque characteristic "h" is inverted. However, the energizing current applied to the stepping motors 17a and 17b may be only in a forward direction. Therefore, as shown in FIG. 8D, the waveforms of the absolute values in torque characteristic "h" is desired.

Hence, the current limit signals "c" and "$c_1$" corresponding to the energizing current, these signals being delivered from the voltage output circuits 22a and 22b to the motor driver circuits 21a and 21b each, are indicated as a release period T1 of the shutter 10 shown in FIG. 8E, and are changed in response to the waveforms of the absolute values of the torque characteristic "h".

In this way, the current value of the energizing current supplied to the stepping motors 17a and 17b is changed according to the opening and closing of the shutter 10 of each hopper, whereby wasteful power consumption can be restrained, and power consumption can be restrained while excellent shutter characteristics are maintained.

At a charge period $T_2$ of materials 2, in the case where a change in required torque occurs, as indicated as a charge period $T_2$ of materials 2 in FIG. 8E, the current limit signals "c" and "c1" delivered from the voltage output circuits 22a and 22b to the motor driver circuits 21a and 21b each may be controlled so as to be changed according to a change in torque during charge of the materials 2.

As has been described above, in the material supply and discharge apparatus according to the present invention, the current voltage of the hold current applied to a motor while a shutter is closed is highly set during a period in which materials are continuously supplied into the hopper, and is lowly set during a period in which materials have been held in the hopper.

In addition, in the material supply and discharge apparatus according to the present invention, the hold current value is controlled so that an average current value of a hold current applied to the motor is small in a duration from reception of the materials in the hopper to the start of discharging the hopper from the discharge port, as compared with a hold current value relevant to the motor at the start of loading relevant to the shutter caused by the materials dropped from the material supply mechanism.

Therefore, the material supply and discharge apparatus according to the present invention can restrain power consumption caused by a hold current applied to a motor during a period when a hopper shutter is closed while excellent shutter characteristics are maintained.

In addition, in the material supply and discharge apparatus according to the present invention, a relationship between the hold current value when material loading starts and an average current value is adjusted according to physical attributes of materials supplied into the hopper.

Further, in the material supply and discharge apparatus according to the present invention, the current value of an energizing current supplied to a motor during a period of shutter opening and closing operation is controlled so as to be changed according to a change in torque required for opening and closing of the shutter.

Furthermore, in the material supply and discharge apparatus according to the present invention, the hold current value supplied to a motor during a shutter closing period is controlled so as to be changed according to a change in torque during charge of the materials.

As has been described above, the material supply and discharge apparatus according to the present invention can always restrain power consumption to its required minimum under a given condition.

Therefore, according to the present invention, there can be provided a material support and discharge apparatus in which the hold current relevant to a motor while the hopper shutter is closed is changed according to a material charge period and the subsequent period, whereby power consumption is restrained while excellent shutter characteristics can be maintained, and running cost can be reduced.

What is claimed is:

1. A material supply and discharge apparatus comprising:
   a hopper having a receptacle port for materials at an upper end thereof and a discharge port for the materials at a lower end thereof;
   a material supply mechanism disposed upwardly of the hopper, the mechanism causing the materials to be dropped from the reception port into the hopper;
   a shutter turnably mounted so as to open and close the discharge port relevant to the hopper, the shutter being driven to be opened and closed so as to be released downwardly under a load in the gravity direction of the materials when the materials are dropped from the material supply mechanism after the discharge port has been closed in order to temporarily hold the materials in the hopper;

a motor linked with the shutter in order to drive the shutter to be opened and closed, a holding current being applied during closing of the shutter, thereby the shutter imparting to the shutter a torque against a force released downwardly by the load in the gravity direction of the materials; and a shutter control portion for setting the hold current applied to the motor from the start time for loading applied to the shutter caused by the materials dropped from the material supply mechanism to a predetermined period, to a first hold current value capable of applying to the shutter a torque bearing a shock when the materials are charged, and setting a hold current applied to the motor from after an elapse of the predetermined period to the start of discharge from a discharge port of the hopper to a second hold current value smaller than the first hold current value capable of applying to the shutter a toque against a force released downwardly under a load in the gravity direction of the materials.

2. A material supply and discharge apparatus according to claim 1, wherein the shutter control portion comprises a motor control portion for controlling the holding current so that an average current value of the hold current applied to the motor is reduced until the materials has been started to be discharged from the hopper discharge port after the materials have been received by the hopper as compared with the hold current value relevant to the motor at the start of loading relevant to the shutter caused by the materials dropped from the material supply mechanism.

3. A material supply and discharge apparatus according to claim 2, further comprising hold current adjusting means for adjusting a relationship between a hold current value relevant to the motor when the loading starts and the average current value according to physical attributes of materials supplied into the hopper from the material supply mechanism.

4. A material supply and discharge apparatus according to claim 3, wherein the hold current adjusting means comprises a hold current condition setting table and a current adjuster circuit, wherein a hold current value relevant to the motor when the loading starts and a period of applying the hold current and the average current value and a period of applying the average value are stored for each type of the material in the hold current condition setting table, and types of the materials primarily include physical attributes of materials such as the weight, shape, and specific gravity of each material or a total weight of materials to be housed one time in one hopper, the physical attributes being a milestone of a shock during a material drop or a static weight after dropped;

the shutter control portion sets a period of applying a hold current to the motor when the loading starts from the hold current condition setting table and a period of applying the average current as periods specified according to type of the material; and the current adjuster circuit sets the hold current value relevant to the motor when the loading starts from the hold current condition setting table and the average current value as current values specified according to type of the material.

5. A material supply and discharge apparatus according to claim 2, wherein the shutter control portion controls a current value of an energizing current supplied to the motor according to a change of a torque required for opening and closing of the shutter during a period for opening and closing operation of the shutter.

6. A material supply and discharge apparatus according to claim 2, wherein the shutter control portion controls the hold current value so as to be changed according to a change of a torque when the material is charged.

7. A material supply and discharge apparatus according to claim 2, wherein the shutter control portion comprises:

a motor control portion for outputting a motor drive signal and a hold current control signal based on a hopper release signal from a main control portion;

a voltage output circuit for outputting a current limit signal based on the hold current control signal from the motor control portion; and a motor driver circuit for supplying a drive signal based on the motor drive signal from the motor control portion and the current limit signal from the voltage output circuit.

8. A material supply and discharge apparatus according to claim 2, wherein the shutter control portion comprises:

a motor control portion for outputting a motor drive signal, a hold current control signal, and a current adjusting signal based on a hopper release signal from a main control portion;

a voltage output circuit for outputting a current limit signal based on the hold current control signal from the motor control portion;

a motor driver circuit for supplying a drive signal to the motor based on a motor drive signal from the motor control portion and the current limit signal from the voltage output circuit; and a current adjuster circuit for adjusting the current limit signal caused by the voltage output circuit based on the current adjusting signal from the motor control portion.

9. A material supply and discharge apparatus according to claim 1, further comprising hold current adjusting means for adjusting a relationship between the first hold current value and second hold current value relevant to the motor at the start of the loading according to physical attributes of materials supplied into the hopper from the material supply mechanism.

10. A material supply and discharge apparatus according to claim 9, wherein the hold current adjusting means comprises a hold current condition setting table and a current adjuster circuit, wherein the first hold current value and a period of applying the first hold current and the second hold current value and a period of applying the second hold current or the like are stored for each of types of the materials in the hold current condition setting table, and the types of materials primarily include physical attributes of materials such as the weight, shape, and specific gravity of each material or a total weight of materials to be housed one time in one hopper, the physical attributes being a milestone of a shock during material drop or a static weight after dropped;

said shutter control portion sets a period of applying the first hold current and a period of applying the second hold current as periods specified according to type of the material from the hold current condition setting table; and said current adjuster circuit sets the first hold current value and second hold current value as current values specified according to type of the material from the hold current condition setting table.

11. A material supply and discharge apparatus according to claim 1, wherein the shutter control portion controls a current value of an energizing current supplied to the motor according to a change of a torque required for opening and closing of the shutter during a period for opening and closing operation of the shutter.

12. A material supply and discharge apparatus according to claim 1, wherein the shutter control portion controls the hold current value so as to be changed according to a change of a torque when the material is charged.

13. A material supply and discharge apparatus according to claim 1, wherein the shutter control portion comprises:
    a motor control portion for outputting a motor drive signal and a hold current control signal based on a hopper release signal from a main control portion;
    a voltage output circuit for outputting a current limit signal based on the hold current control signal from the motor control portion; and
    a motor driver circuit for supplying a drive signal based on the motor drive signal from the motor control portion and the current limit signal from the voltage output circuit.

14. A material supply and discharge apparatus according to claim 13, wherein, when the hold current control signal from the motor control portion is composed of a first hold current control signal and a second hold current control signal, the voltage output circuit comprises:
    a first transistor that is electrically conductive during a period when the first hold current control signal is inputted from the motor control portion;
    first resistance means for, when the first transistor is electrically conductive, providing a first current limit signal;
    a second transistor that is electrically conductive during a period when the second hold current control signal is inputted from the motor control portion; and
    second resistance means for, when the second transistor is electrically conductive, providing a second current limit signal, wherein the motor driver circuit changes a current value of the hold current supplied to the motor based on the first and second current limit signal.

15. A material supply and discharge apparatus according to claim 1, wherein the shutter control portion comprises:
    a motor control portion for outputting a motor drive signal, a hold current control signal, and a current adjusting signal based on a hopper release signal from a main control portion;
    a voltage output circuit for outputting a current limit signal based on the hold current control signal from the motor control portion;
    a motor driver circuit for supplying a drive signal to the motor based on a motor drive signal from the motor control portion and the current limit signal from the voltage output circuit; and
    a current adjuster circuit for adjusting the current limit signal caused by the voltage output circuit based on the current adjusting signal from the motor control portion.

16. A material supply and discharge apparatus according to claim 15, wherein, when the hold current control signal from the motor control portion is composed of a first hold current control signal and a second hold current control signal, the voltage output circuit comprises:
    a first transistor that is electrically conductive during a period when the first hold current control signal is inputted from the motor control portion;
    a first variable resistor for, when the first transistor is electrically conductive, providing a first current limit signal;
    a second transistor that is electrically conductive during a period when the second hold current control signal is inputted from the motor control portion; and
    a second variable resistor for, when the second transistor is electrically conductive, providing a second current limit signal,
    wherein the current adjuster circuit varies the first and second variable resistance based on the current adjusting signal, thereby adjusting the first and second current limit signal; and
    the motor drive circuit changes a current value of the hold current supplied to the motor based on the first and second current limit signal.

* * * * *

UNITED STATES PATENT AND TRADEMARK OFFICE
CERTIFICATE OF CORRECTION

PATENT NO.    : 6,622,894 B2  
DATED         : September 23, 2003  
INVENTOR(S)   : Iruru Matsunaga Page 1 of 1

It is certified that error appears in the above-identified patent and that said Letters Patent is hereby corrected as shown below:

<u>Title page,</u>  
Item [73], Assignee, change "Anritsu Corporation, Tokyo (JP)" to  
-- Anritsu Industrial Solutions Co., Ltd., Atsugi-shi, Kanagawa (JP) --

Signed and Sealed this

Ninth Day of November, 2004

JON W. DUDAS  
*Director of the United States Patent and Trademark Office*